United States Patent

[11] 3,595,148

| [72] | Inventor | George Cagen<br>Brooklyn, N.Y. |
|---|---|---|
| [21] | Appl. No. | 800,512 |
| [22] | Filed | Feb. 19, 1969 |
| [45] | Patented | July 27, 1971 |
| [73] | Assignee | Ideal Toy Corporation<br>Hollis, N.Y. |

[54] TOY CAMERA
13 Claims, 14 Drawing Figs.

[52] U.S. Cl. ................................................. 95/13,
95/89
[51] Int. Cl. ................................................. G03b 17/50
[50] Field of Search ........................................ 95/13, 31,
96, 89; 355/28, 112

[56] References Cited
UNITED STATES PATENTS

| 1,226,838 | 5/1917 | Wolber | 95/36 |
| 1,424,816 | 8/1922 | Grillone | 95/13 |
| 2,373,536 | 4/1945 | Burbridge | 95/13 |
| 2,403,717 | 7/1946 | Harvey | 95/13 |
| 2,871,777 | 2/1959 | Lothrop et al. | 95/13 X |
| 2,937,945 | 5/1960 | Weyde et al. | 95/13 X |

*Primary Examiner*—Samuel S. Matthews
*Assistant Examiner*—Richard L. Moses
*Attorney*—Amster & Rothstein ABSTRACT: A toy camera permitting "amateur" or youthful photographers to take and develop photographs of substantial quality without complex attendant mechanism. The camera includes a self-contained detachable developing tank which communicates with and accepts exposed elements from the camera's film roll feed structure. Following each exposure, a film advance mechanism causes the exposed film segment to be advanced a predetermined length into the developing tank and at the same time places a fresh segment of unexposed film in the exposure position. A severing mechanism is then operated to cut the exposed segment from the continuous film roll, after which the severing member acts to block light from entering into the camera body during development.

INVENTOR
GEORGE CAGEN

INVENTOR
GEORGE CAGEN
BY
ATTORNEYS

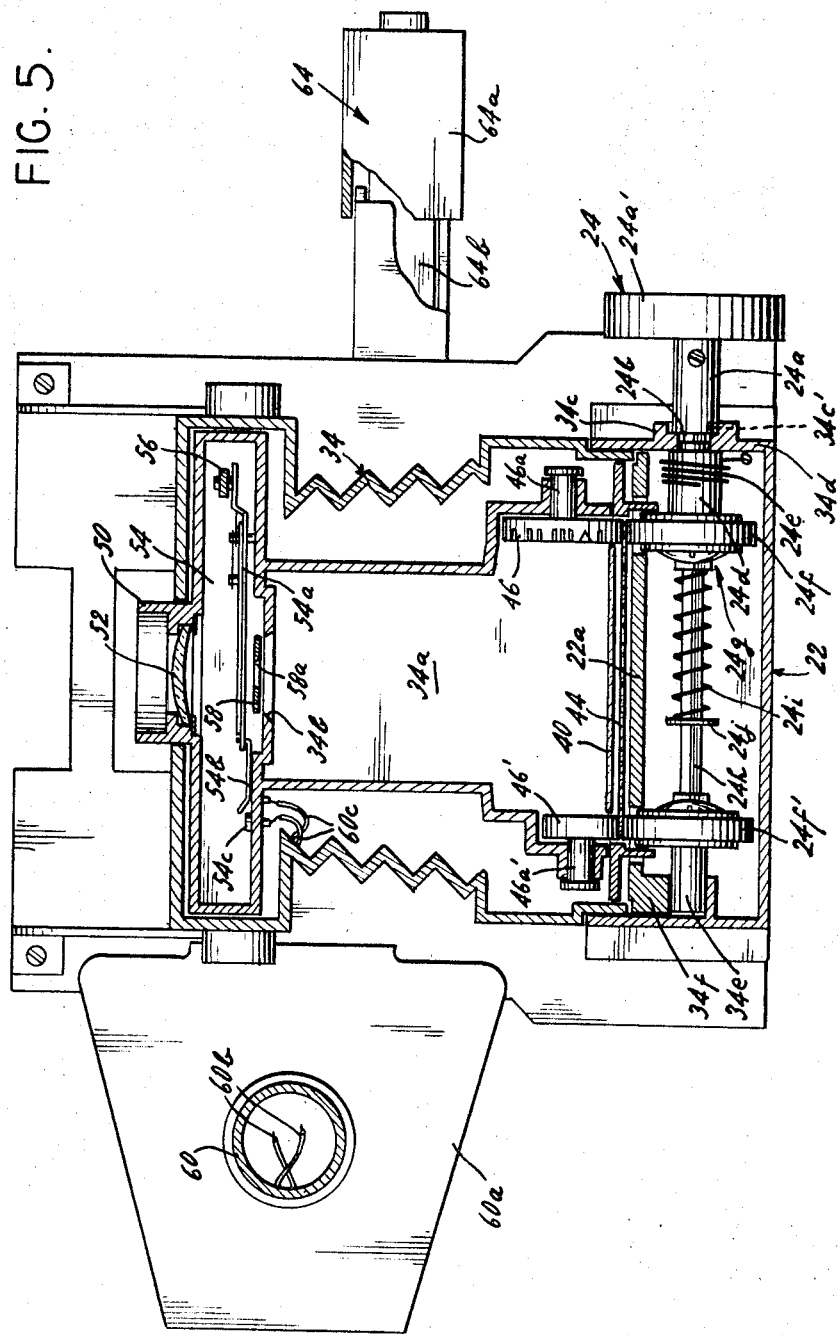

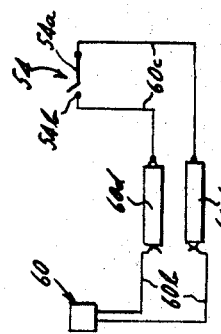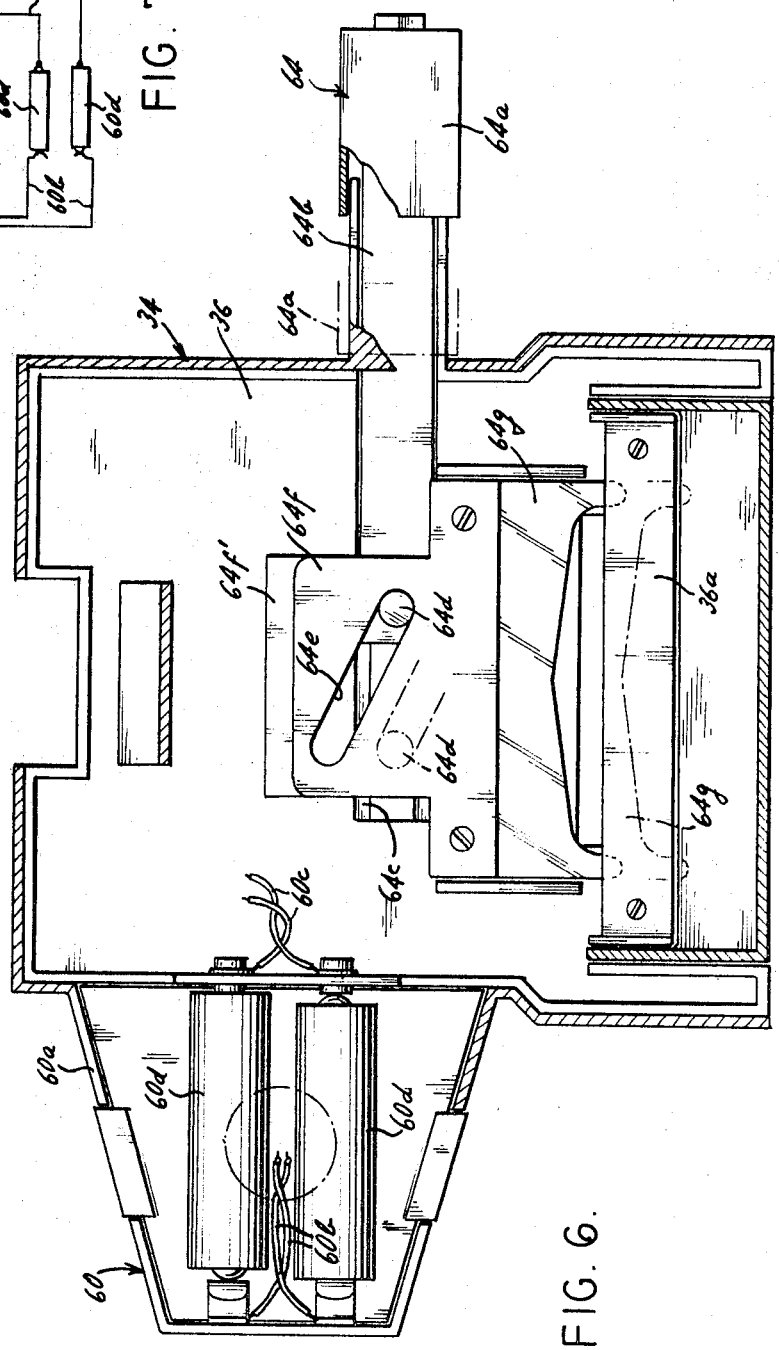

INVENTOR
GEORGE CAGEN
BY
ATTORNEYS

TOY CAMERA

This invention relates to photographic apparatus and in particular, to cameras adapted for use as a toy and including a built-in developing arrangement.

The toy industry has, in recent times, generally begun to seek to take advantage of many of the new advances in several related but distinct technological areas. This is part and parcel of the realization that although seemingly remote, these various areas have clear and desirable applications to toys. The proper utilization in toys of technical advances made in these other areas has already enhanced the play value of toys incorporating such advances.

One technical area in which advances have been made but not often applied elsewhere is photographic optics. While it has been generally thought that it would be desirable to employ modern photographic techniques in other environments, the toy area has not received significant attention in this regard. Thus, particularly because of the cost and complexity of photographic devices, it has been considered prohibitively expensive, as well as too difficult, to incorporate such devices in toys. Problems have existed as to shutter mechanisms (overly complex to obtain quality results), film advance mechanisms (necessity to establish control over excessive advance and film wastage), exposure apparatus (no reliable photographs obtainable without substantial extra illumination), developing arrangements (usually separate and complex with multiple solutions) and the appearance of the camera itself (not usually considered in "toy" category).

It is therefore an object of this invention to eliminate one or more of the aforesaid difficulties.

It is a further object of this invention to furnish a toy camera apparatus to simplify the exposing and developing of photographs in a noncomplex environment.

It is also an object of this invention to provide a toy camera arrangement which is attractive as a toy and yet is functionally effective from a photographic viewpoint.

In one particular illustrative embodiment of this invention, an integrated camera structure is disclosed with viewing, exposure, film advance and developing provisions included in components thereof. The camera includes a basic body which can optionally be designed with humorous ornamental features which will enhance the play value of the camera and yet not interfere with any of the photographic functions thereof. The present description will deal essentially with the photographic elements and functions, and where relevant, the humorous design features will be indicated as well. Initially, the basic camera body includes a front portion containing a lens mount, shutter chamber and an exposure aperture, together with a multiple-position shutter stop mechanism to allow for exposures under different ambient light conditions. The exposure aperture communicates with the exposure chamber which has as its rear wall a curved halftone screen through which each exposure is made. A disposable film cassette is mounted above the exposure chamber and is arranged to feed from a continuous film downward across and behind the curved exposure screen but spaced therefrom a discrete small distance. In this manner, the film is guided through a narrow channel formed by the curved screen and the correspondingly curved front wall of the camera back, whereby the film is directed ultimately into the developing tank.

The back portion of the camera, which can be removed therefrom for the purpose of film loading, removal and/or repair, includes an upwardly projecting viewer as well as the drive for the film advance mechanism. The viewer comprises a hollow rear portion communicating with a viewing chamber through a first smaller rear aperture; the front of the viewer opens into the chamber through a somewhat larger aperture which is directed towards the prospective image subject. The rear portion of the viewer is generally bell-shaped, with the wider portion of the bell adapted to be placed against the operator's eye, thus creating a predetermined spacing arrangement between the shade, the viewing chamber and the subject. The operator is thereby required to view the subject at the proper distance and orientation therefrom, completely dispensing with the need for rangefinders viewfinders or other complex arrangements of this kind. The front surface of the viewer can be illustratively surrounded with a plate humorously illustrating an eye or other visual ornament, for example including the front viewer aperture acting as the pupil of the eye, together with "bloodshot" lines thereon.

The film advance drive mechanism, also incorporated in the camera back, includes a knob and slotted collar arrangement adapted to advance the film one exposure segment either prior to the first exposure or following each exposure, without the necessity for the operator to view the actual film (which is concealed in the camera) or use any other conventional film guide or indexing arrangement. The film advance mechanism is provided with a shaft mounted internally of the knob and collar and which extends through the various camera back walls and is journaled in a receiving mount on the opposite side of the back. The slot on the knob collar is designed to normally receive a corresponding tab projecting from an external hub on the camera back, thus serving to lock the advance mechanism in place. A first spring is mounted on the advance shaft between an internal hub and a fixed stop located on the shaft inward from the opposite journaled end. A second limiting spring is helically wound around a different portion of the shaft envelope to permit rotation in a first direction but to limit rotation in the opposite "wrong" direction.

The film advance mechanism is utilized, for example, when an exposure has been made, by initially withdrawing the knob and shaft to disengage the slot and tab against the urging of the internally mounted shaft spring. Rotation in the correct direction then proceeds, with engagement of the slotted collar and tab only being permitted following a 360° rotation of the knob. When the knob and the collar again reach the first position, after having advanced the film between corresponding rollers driven by the shaft, the slot and tab again engage and the internally mounted spring draws the slotted collar and tab into engagement with each other. The advance mechanism is then "locked" again and the operator is instructed that such locking arrangement indicates that the advance is completed.

The camera body also includes an exposure numbering wheel which operates in conjunction with the film advance mechanism. Thus, the film advances between a pair of spaced rollers which are directly driven and mounted upon the film advance shaft and a second pair of equally spaced slave rollers, one of which is a numbering wheel bearing identifying cutouts for guiding exposing light rays to the border of a film segment. As the film is advanced, the numbering wheel cutouts are arrayed against the border of the film member at the exposure location; during the actual exposure, the sensitive border is also exposed, thus giving the photograph an index and permitting subsequent identification or sequential filing.

During normal camera use, light is prevented from entering into the camera body by the dependent mounting thereon of the developing tank to be described hereinafter. When the developing tank is detached for purposes of developing an exposed film segment, light is prevented from entering into the camera body (and thus reaching additional portions of unexposed film) by a combined light trap and knife mechanism. This mechanism is controlled from an external shaft and provides cutting action transversely to the direction of film travel by means of the engagement of a shaft pin and a slant slot in the knife holder. The blade and its holder ride in a channel between a frontward position in which the film is free to be advanced (e.g., following an exposure), to a rearward position where the film advance opening is blocked. During the excursion from the front to the back position, effected by means of insertion of the external shaft, the cutting edge of the knife blade severs the advanced film segment. The blade remains at its rearward position to prevent the entry of light from below into the camera body, thus protecting other unexposed film.

This mechanism is adapted to be operated upon first loading the camera so as to remove the waste film portion at the leading edge of the film roll; it is also designed to be used following each exposure, whereby the external shaft is withdrawn, the mechanism moves from its rear light-blocking position to its front clear position, the film is advanced downward through the opening and then, by insertion of the external shaft, the mechanism is moved forward, severing the film and acting as a light trap.

The dependent developing tank mates on to the bottom of the camera case during normal camera use and is also maintained thereon by a U-shaped clamp which grips the underside of the tank and depends from the camera bottom. The tank comprises an irregular shaped case for containing developing liquid and an aperture through which the liquid can be changed or replenished. There is also an internal film carrying guide chamber which receives exposed film segments therein. When the tank is affixed to the camera, a pair of spaced pins are forcibly depressed into the tank by the camera bottom to hold down a pinned, spring-loaded gate mechanism. With the tank passageway in this unblocked condition, an exposed film member (or the initial waste film segment) can be received into the tank. When, however, the tank has received such a member and is illustratively detached from the camera to permit separate development, the spring-loaded gate swings upward against the free-riding pins and a closure element blocks the tank entry, thus permitting the developing liquid to act upon the exposed film segment while simultaneously preventing the introduction of any extraneous ambient light. The closure element also acts as a fluid seal, thus permitting agitation of the tank by the operator to achieve suitable developing action within the tank.

It is therefore a feature of an embodiment of this invention that a camera structure is provided with simplified shutter, film advance, film severing and developing equipment to achieve quality photographs having substantial play value.

It is a further feature of an embodiment of this invention that a camera structure, including a disposable film cassette, feeds the film along a curved halftone screen to an exposure location and that following exposure, the film segment is advanced a predetermined distance into a depending development tank.

It is still another feature of an embodiment of this invention that a film severing mechanism operates after film advance to cut an exposed film segment from the film roll and permit separate entry into the developing tank while serving at the same time to block the passage of light into the camera body.

Yet another feature of an embodiment of this invention is a detachable developing tank with a liquid and light seal to permit separate developing and agitation.

It is also a feature of an embodiment of this invention that a spring-loaded and spring-controlled film advance mechanism is arranged with a tab and slot configuration to permit disengagement, rotation and engagement in sequence to advance the film the equivalent of one frame corresponding to an exposed film segment into a development tank.

The above brief description, as well as further objects, features and advantages of the present invention, will be more fully appreciated by reference to the detailed description of a presently preferred, but nonetheless illustrative embodiment demonstrating objects and features of the invention, when taken in conjunction with the accompanying drawing, wherein:

FIG. 5 is a sectional view of the lower camera body showing the lens, shutter, number wheel and film advance mechanism, taken along the line 5-5 of FIG. 1;

FIG. 6 is a sectional view of the camera body and base interface, showing the flash battery compartment and the knife-blocking mechanism, taken along the line 6-6 of FIG. 1;

FIG. 7 is a simplified electrical schematic diagram of the flash operation circuit;

Figure 8:
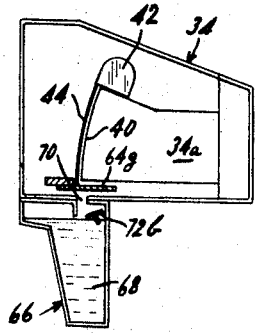
Figure 9:
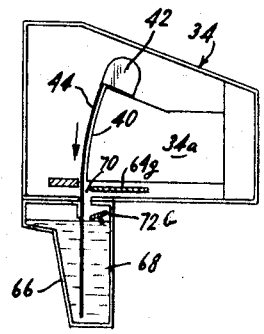
Figure 10:
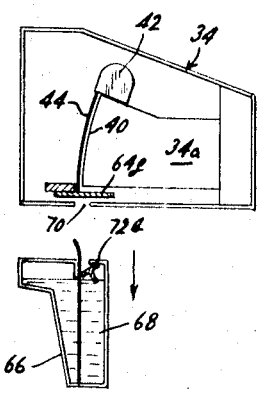
Figure 11:
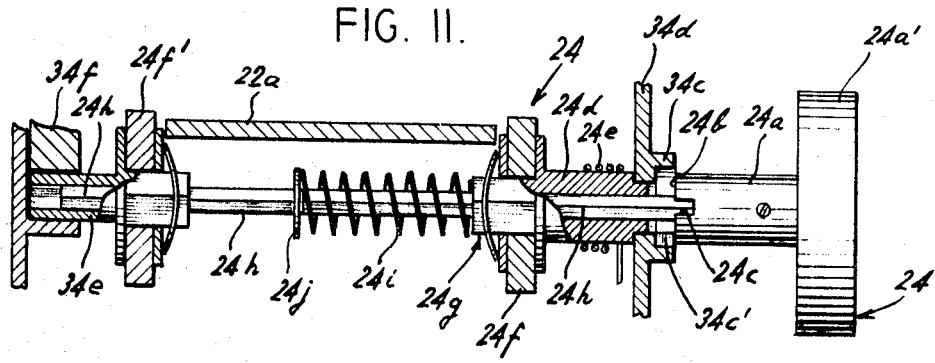
Figure 13:
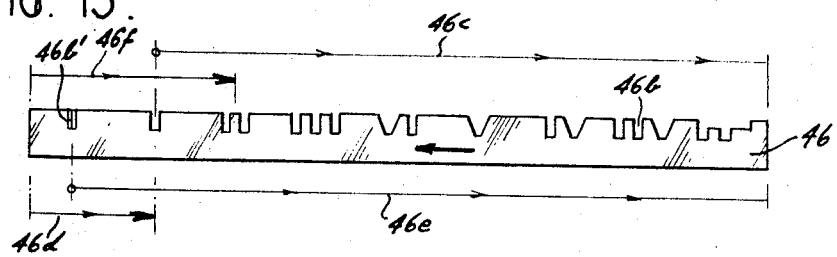
Figure 14:
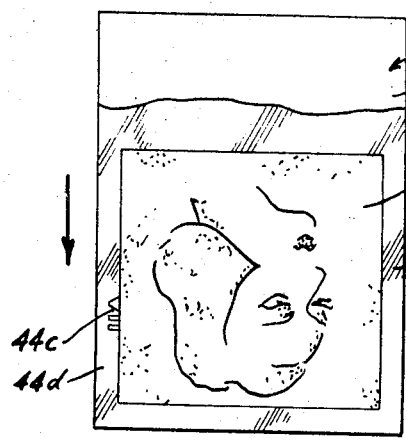
Figure 12:
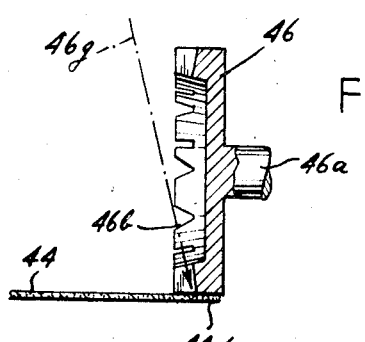

FIGS. 8—10 are simplified sequential views of the camera and developing tank in outline form generally illustrating the steps of film advance, severing and development;

FIG. 11 is an enlarged detailed view of the film advance structure;

FIG. 12 is an enlarged detail view of the numbering wheel and housing;

FIG. 13 is a layout development of the numbering wheel circumference showing its direction of travel; and FIG. 14 is a typical exposed and developed film member with an indexing number appearing thereon.

THE OVERALL CAMERA BODY COMPONENTS

Figure 1:
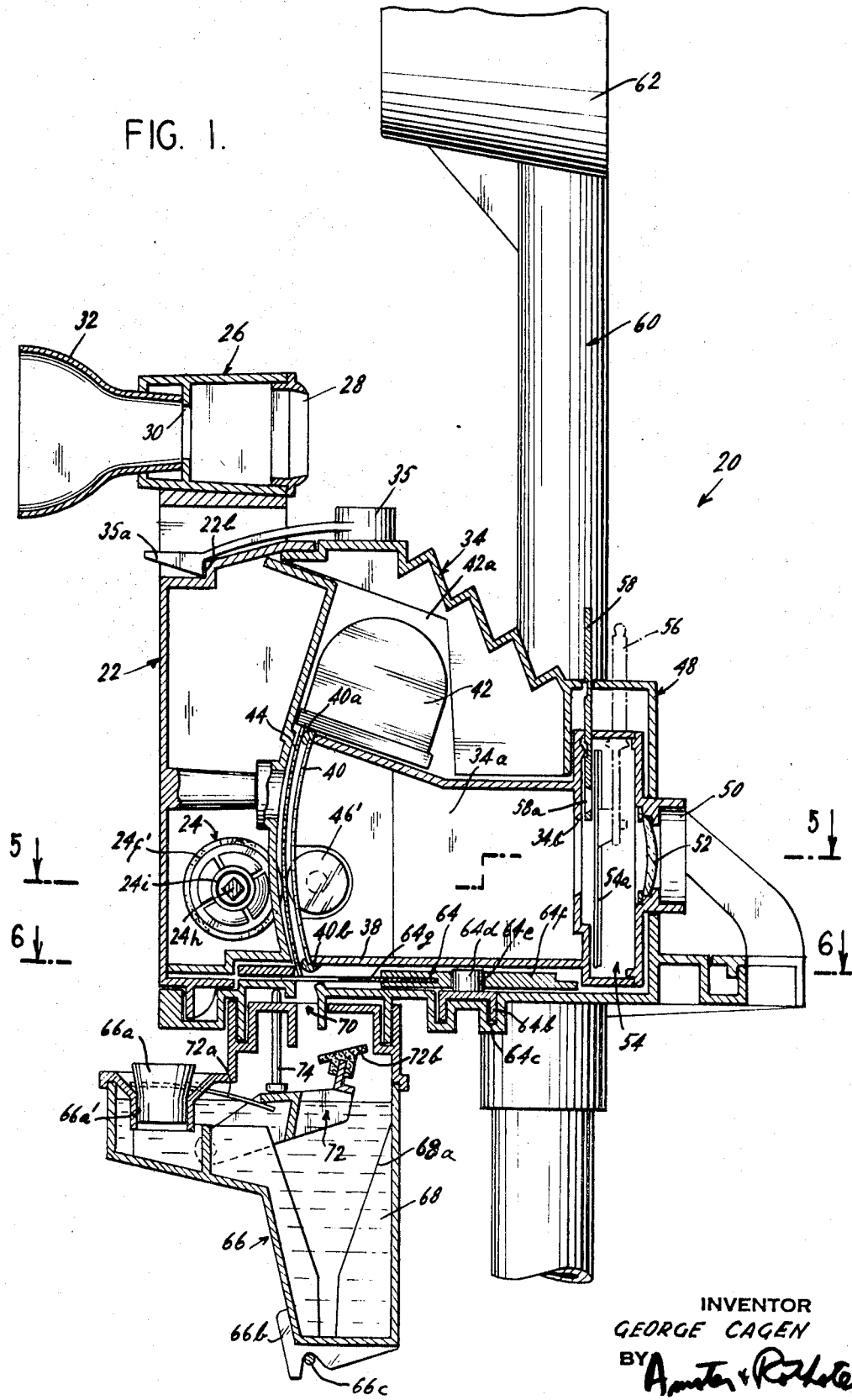
FIG. 1 is an overall side sectional elevation of a camera in accordance with the present invention in assembled condition.
Figure 2:
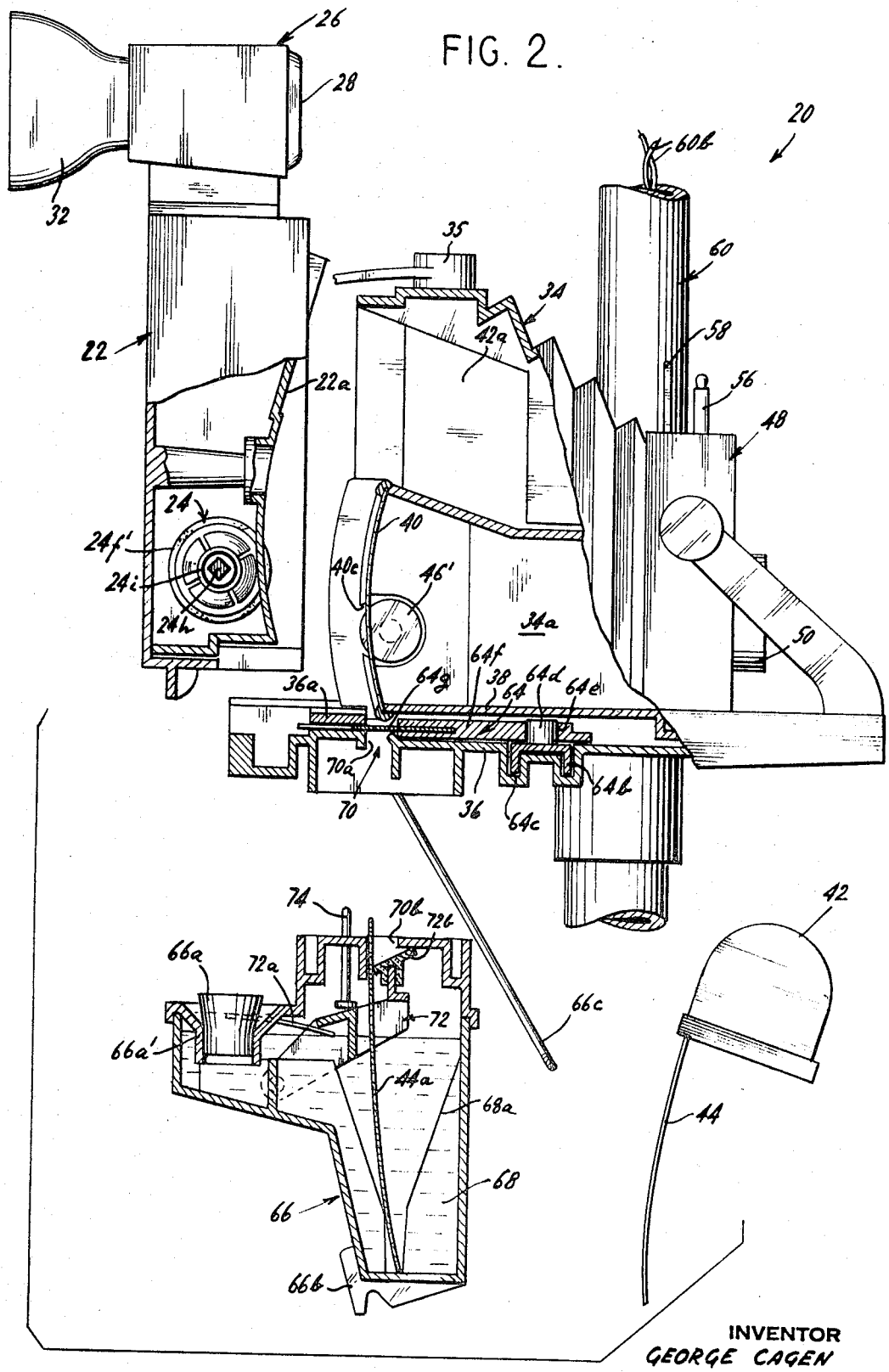
FIG. 2 is an exploded view of the major camera portions in section or partially broken away, showing a film member in the developing tank.

The camera apparatus of the present invention will be described hereinafter initially in overall terms with respect to the major components thereof, followed by descriptions of the detailed operation of each component and an illustrative sequence of operation of the camera. Thus, the assembled camera is shown in side sectional elevation in FIG. 1, with the same general view being illustrated in FIG. 2 with the camera components being shown in exploded form. Referring to FIGS. 1 and 2, the overall camera is identified by numeral 20 and includes a basic back portion 22 having a front concave surface 22a adapted to match the orientation of the camera body and the curved screen 40 thereof when the camera is assembled as illustrated in FIG. 1. The advance knob 24a' of the film advance mechanism 24 is illustrated in FIGS. 1 and 2 and will be described in greater detail below. Mounted atop the back 22 is a viewer structure 26 having a front viewing aperture 28, a rear viewing aperture 30 and a rearwardly directly viewing hood 32 connected to aperture 30. No separate focusing, rangefinding or viewfinding equipment is needed in connection with viewer 26 as the camera is illustratively of the fixed-focus type. Nevertheless, ranging in on a subject is expedited by the forced placement of the operator's eye at no closer distance than the rear periphery of hood 32. The operator's eye will then be "focused" through apertures 28 and 30 at the desired subject.

The surrounding camera body 34 is illustrated in FIGS. 1 and 2 as having an irregular bellowslike configuration. This configuration is simply illustrative, but permits the camera to assume a simulated "professional" appearance, thereby adding to its play value and humorous effect. The camera body 34 includes numerous elements and is bounded on the bottom by irregularly shaped base 36, with internal bottom wall 38 acting as the lower border of the exposure chamber. The rear of exposure chamber 34 is curved halftone screen 40 over which film 44 passes in its downward travel from cassette 42 placed within cassette chamber 42a. The film travels from cassette 42 over fixed guides 40a and 40b and is advanced along the channel illustrated in FIG. 1 by means of oppositely directed pressure between drive advance rollers 24f and 24f' and respective driven rollers 46 and 46' on the opposite side of film 44 (FIG. 5).

The front camera portion 48 includes light guide and lens shade-mount 50 forward of lens 52. Light is admitted through guide 50 and lens 52 into shutter chamber 54 in which the shutter mechanism to be described below is contained and which is activated by shutter rod 56. Between the shutter and exposure chamber entry aperture 38b is shutter stop 58, illustrated in FIG. 1 in its upper unblocking position. When sufficient ambient light is available to obtain proper exposures, shutter stop 58 is lowered to a point where control aperture 58a is in the entry path of light admitted through guide 50, lens 52 and the ultimately open shutter; when additional light is required to be admitted to obtain the necessary exposure, shutter stop 58 is raised to the position illustrated in FIG. 1. (Auxiliary illumination can be supplied by flash attachment 60 including flash reflecting receptacle 62 mounted atop the cylindrical shaft thereof.)

THE LIGHT TRAP AND FILM SEVERING MECHANISM

The combined light trap and severing mechanism 64 is illustrated in two different positions in FIGS. 1 and 2. In FIG. 1, the mechanism is illustrated in its retracted position whereby film member 44 can, upon rotation of advance knot 24a', travel into connecting passageway 70 between the camera and the depending developing tank 66. Following such advancement, the exposed or waste film segment at the leading edge of a film roll is severed from the roll by causing the combined mechanism 64 to travel from right to left in FIGS. 1 and 2 and to assume the light blocking position illustrated in FIG. 2. Passageway 70a is thereby fully blocked to light with respect to the upper portion of the camera body, with exposed film segment 44a having been deposited within developing tank 66.

In the position illustrated in FIG. 1, the knife mechanism 64 corresponds substantially to the view thereof given in detail in FIG. 6. The orientation of the front portion of blade element 64g in this position permits passageway 70 to be open and to thereby permit the passage therethrough of an exposed film segment of roll 44. By insertion into the camera of handle 64a coupled to shaft 64b, camlike action between pin 64d and slanted slot 64e in rear retaining member 64f causes attached elements 64f and 64g to move towards the rear of the camera and to thereby assume the position illustrated in FIG. 6 in dot-dash lines. In such position, which corresponds to that illustrated in side elevation in FIG. 2, the knife mechanism acts as a light trap with respect to passageway 70, preventing light from passing through camera passageway 70a subsequent to detachment of developing tank 66.

THE DEVELOPING TANK

Developing tank 66 defines an internal chamber for receiving developing liquid 68 which can be replenished by the appropriate removal of stopper 66a. Within the developer chamber there is a further subdivided chamber bounded by guide walls 68a to receive therein an exposed film segment 44a (FIG. 2). In the attached position illustrated in FIG. 1, the upper tip of pin 74 is depressed by contact with the underside of camera base 36, thereby also depressing hinged gate 72 against the action of leaf spring 72a. This leaves film passageway 70 unobstructed and allows film segment 44a to be advanced into the tank within guide walls 68a and then severed from the roll 44. When this occurs, the tank may be detached from the camera body and, as illustrated in FIG. 2, gate 72 thereupon swings upward under the influence of leaf spring 72a, with gate closure element 72b serving to block developing tank entrance passageway 70b. In the orientation illustrated in FIG. 2, closure 72b acts as both a light and fluid seal with respect to passageway 70b; developing tank 66 can then be agitated for suitable interaction of the developer and the exposed film member. Following development and withdrawal of the developed film member from the tank, the tank can be reattached to the camera by the elevation of the tank into the matching indentations of the camera base 36 and the placement of U-shaped depending clamp 66c into the recess on lug 66b. The camera is then prepared for the advancement of subsequent film elements into the development tank.

THE EXPOSURE LOCATION AND THE INDEXING MECHANISM

Figure 4:
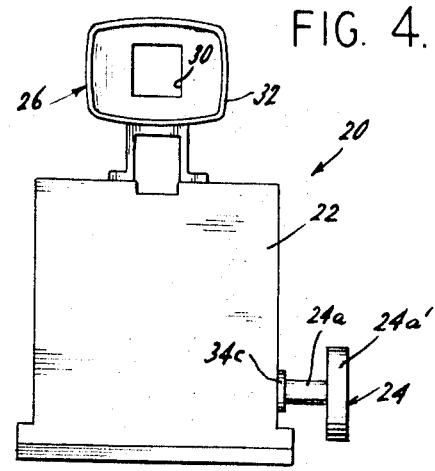
FIG. 4 is a rear elevation of the camera viewer and supporting back structure removed from the camera.
Figure 3:
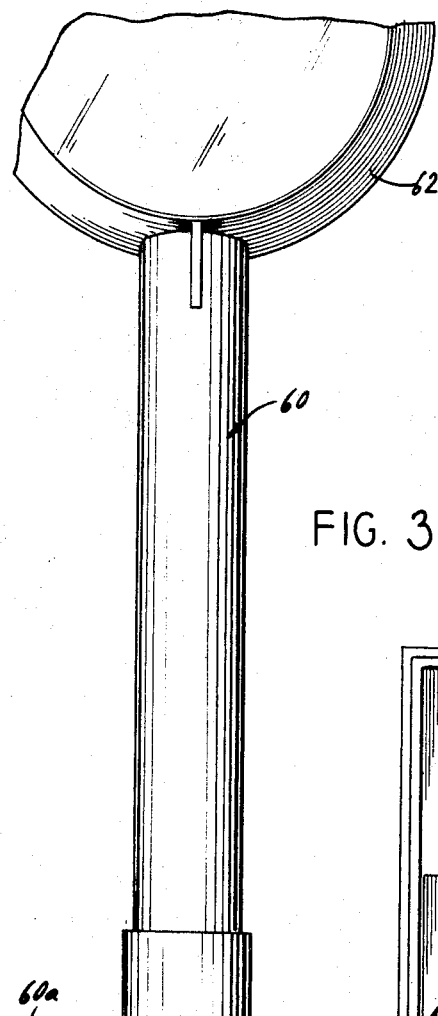
FIG. 3 is a partially fragmented and broken-away rear view of the camera body showing the screen and tank.

The view of FIG. 3 illustrates the rear of the camera with the back removed while FIG. 4 is a reduced and simplified rear elevation view of the camera back alone with the viewer apparatus mounted thereon. The upper right-hand portion of FIG. 3 illustrates the interrelationship of the film, the exposure screen and the numbering wheel. Thus, film cassette 42 is mounted within cassette chamber 42a and feeds continuously rolled film 44 downward towards development tank 66. Behind (i.e., towards the front of the camera) film 44, illustrated broken away in FIG. 3, is exposure screen 40 which illustratively may be of the halftone type described in copending application Ser. No. 701,918, now abandoned filed Jan. 31, 1968 and assigned to the assignee of the present application; film 44 may also be of direct positive paper as described in said application. The screen is screw-mounted in place and has side brackets with cutout slotted portions 40c and 40d to allow slaved film advance rollers to project therethrough as illustrated in FIGS. 1 and 2 as well. The rollers 46 and 46' are slaved or "dummy" in that they have no independent advance mechanism, but as illustrated in FIGS. 1 and 5, they serve to advance the film by contact with correspondingly opposite rollers 24f and 24f' of film advance mechanism 24, with the film 44 being advanced between the opposite pairs of rollers.

In addition, the right-hand roller 46 in FIG. 3 acts as a numbering wheel to index film segments as they are exposed at the exposure location. From the views of FIGS. 3 and 5, it can be seen that the segment of film 44 at the exposure location has one of the identifying Roman numeral cutouts immediately in front of its right-hand border, i.e., between the film and exposure aperture 34b. Accordingly, the film border is adapted to receive an exposure corresponding to that particular numeral cutout. The illustrations of FIGS. 12 and 13 show the layout development and indexing number application effected by numbering wheel 46. The wheel 46 rotates about shaft 46a and as illustrated in FIG. 13, has several cutouts 46b corresponding to Roman numerals (reading from right to left, the direction of movement, in FIG. 13). The portion of thewheel's circumference bearing identifying cutouts is indicated by line 46c; dimension 46d represents the remaining portion of the circumference which acts as a "lead" section permitting one full rotation of wheel 46 to effect sequential advancement of the Roman numeral cutouts 46b. Thus, the first full rotation of wheel 46 commences with guide cutout 46b' in contact with the film border 44d (FIG. 12). After one complete rotation, during which the travel of the circumference of wheel 46 is equivalent to dimensions 46e and 46d, the numeral "I" is arrayed next to film border 44d for the first exposure. Thereafter, the next full rotation travels the circumference dimensions 46c and 46f, bringing numeral cutout "II" into the exposure location.

In FIG. 12 is illustrated the actual application of an indexing reference to the border 44d of underlying film segment 44. As film advance mechanism 24 is rotated, film 44 is advanced between roller 24f and indexing wheel 46 (FIG. 5). When the film is in the exposure chamber, as illustrated for example in FIG. 1, and an exposure occurs, light (indicated by arrow 46g in FIG. 12) passes through the exposure chamber 34a and through the aligned indexing cutout (e.g., "VII"). The edge 44d of the film thereby receives an indexing exposure just as the exposed image is received on the film itself. Then, following the complete rotation of the numbering wheel in response to one complete rotation of the film advance mechanism, the next successive indexing number is aligned in an exposure position next to the film 44. When a subsequent exposure occurs, this next indexing number will appear on the film. The resultant photograph 44a illustrated in FIG. 14 (as seen from a front elevation, i.e., through lens 52 towards the camera rear) includes an image portion 44b and the indexing identification 44c on border 44d, both of which portions are caused to be placed on the film simultaneously with the exposure.

THE FILM ADVANCE STRUCTURE

In the sectional view of FIG. 5, taken with respect to the line 5-5 of FIG. 1, a view of the lower portion of the camera on planes through the back, exposure chamber and shutter and lens sections of he camera is illustrated. The film advance mechanism 24 is located at the lower portion of FIG. 5, corresponding to the lower rear portion of back section 22 of the camera (compare with FIGS. 1 and 2). The interrelationships of film advance mechanism 24 and the related elements of camera body 34 are illustrated in FIG. 5 and generally include the manner of advancement of film roll 44 previously described into developing tank 66. In order to more fully appreciate the manner of operation of film advance mechanism 24, the showings thereof in FIGS. 5 and FIG. 11 should be considered.

In FIG. 5, the advance mechanism 24 is illustrated in its inserted or locked position whereby rotation thereof is prevented; in FIG. 11, the showing is in the withdrawn position, permitting rotation of the mechanism to advance the film. More specifically, in its locked position as shown in FIG. 5, knob collar 24a is seated around its left periphery 24b within a circular shoulder 34c of body section 34d. Projecting frontward from the lower portion of shoulder 34c is tab 34c', shown in phantom in FIG. 5 and visible with the collar retracted in FIG. 11. From the view of FIG. 11 with the mechanism in its withdrawn condition, it is seen that the edge surface of periphery 24b is precluded from being seated within internal shoulder 34c by blockage between the periphery and projecting tab 34c'. In the view of FIG. 5, the tab 34c' is engaged within the slot 24c, thereby permitting the film advance mechanism to be drawn into the camera body.

The shaft 24h of the advance mechanism can illustratively be of square cross section and is screw attached to knob collar 24a. Fixed stop 24j is mounted on the internal section of shaft 24h, with control spring 24i being fixedly attached to stop 24j; the other end of spring 24i is mounted on an extension of hub 24g. The operation of advancing the film commences with the advance mechanism 24 in the position illustrated in FIG. 5—in this position, the mechanism cannot be turned because of the engagement of tab 34c' in slot 24c. However, when the mechanism is withdrawn from the camera (to the right in FIGS. 5 and 11) against the urging of spring 24i, tab 34c' is no longer engaged in slot 24c, thus permitting rotation of knob collar 24a relative to shoulder 34c. The opposite end of shaft 24h is equally unobstructed as illustrated in FIG. 11, wherein shaft 24h, normally journaled in casing 34e which in turn is within body element 34f, can freely rotate under the influence of an operator.

The position illustrated in FIG. 11 is that following 90° of clockwise rotation (relative to the orientations illustrated in FIGS. 1 and 2), and the mechanism must be continued another 270° in rotation before the locked or engaged position is again reached. During this rotation, the turning of shaft 24h causes the clockwise rotation of advance rollers 24f and 24f'. Each of these rollers is in contact with film roll 44 at opposite edges thereof as shown in FIG. 5. Film advancement results because of the sandwiching of film 44 between drive advance rollers 24f and 24f' attached to the film advance shaft, and respective driven dummy rollers 46 and 46' each mounted for rotation on separate respective shafts 46a and 46a' shown in FIG. 5. These driven rollers, of which 46 is also the numbering wheel described above, have no independent advancement, and only advance when film advance mechanism 24 is activated. When advance mechanism 24 reaches a point 270° further clockwise from that illustrated in FIG. 11, the film segment 44 has been advanced one exposed frame and tab 34c is again engaged within slot 24c under the influence of spring 24i, thereby locking the mechanism and preventing further advancement. At this point, the position of the film mechanism 24 illustrated in FIG. 5 is once again assumed.

As indicated above, the proper direction of rotation for film advance mechanism 24 is clockwise as the mechanism is shown in side elevation in FIGS. 1 and 2. In order to prevent an inexperienced operator from mistakenly attempting to advance the film mechanism in the counterclockwise direction, an additional limiting spring 24e is helically wound around shaft housing 24d. The left-hand end of spring 24e is free, while its right-hand end is fixed to the camera body. Spring 24e thereby permits free rotation of mechanism 24 in the clockwise direction described above (following withdrawal of the shaft to disengage tab 34c' from slot 24c), with no obstruction. However, should the operator either unintentionally or perhaps maliciously attempt to rotate the advance mechanism in the counterclockwise direction (following disengagement of slot 24c and tab 34c'), spring 24e will tighten around housing 24d which itself rotates with shaft 24h. Only a very limited excursion of housing 24d in the erroneous counterclockwise direction is required to reach the holding limit of spring 24e, thereby indicating to the operator that the direction of rotation is wrong. Although the exertion of greatly excessive counterclockwise rotational force could continue rotation in that direction, the application of such force in view of the tightening and holding effect of spring 24e is highly unlikely.

THE CAMERA IN OPERATION

In order to indicate the interrelationship and sequential operation of the various components of the camera of the invention, there follows a description of a typical loading, exposure and development sequence in the use of the camera. Before considering the several detailed views, the three views of FIGS. 8, 9 and 10, illustrating in simplified form the general steps of exposure, film advance and development in connection with the invention, will be reviewed. Thus, FIG. 8 illustrates the condition of the camera either upon initial loading or subsequent to a previous development cycle. In the case of initial loading, the segment of film 44 illustrated immediately to the rear of exposure screen 40 is the waste leader film. Prior to exposure, this must be advanced into developing tank 66 as illustrated in FIGS. 9 and 10, with the segment 44a being discarded upon such advancement and severing. Where FIG. 8 is taken as illustrating the commencement of an exposure cycle, with passageway 70 blocked by the location of blade mechanism 64 and the attachment of tank 66 onto camera body 34, an exposure permits light into exposure chamber 34a whereby film 44 is exposed through exposure screen 40.

Following the exposure, film advance mechanism 24 (not shown in FIGS. 8—10) is operated to advance the exposed film segment into developing tank 66. This is achieved by first withdrawing blade mechanism 64, thus opening up passageway 70 to the travel of the exposed film 44. Between the steps illustrated in FIGS. 9 and 10, blade mechanism 64 is operated to sever exposed film segment 44a from film roll 4, with the exposed segment thereby assuming the position illustrated in FIG. 10 immersed in developer 68 in tank 66. When tank 66 is removed from the bottom of camera body 34, blade mechanism 64 acts as a light trap precluding the exposure of the next exposure film member and closure member 73b precludes other light from entering developing tank 66 and at the same time acts as a fluid seal for the contained developing liquid 68.

LOADING THE CAMERA AND PREPARATION FOR EXPOSURE

Considering the camera in its unloaded condition, the camera back 22 is first removed by unlatching snap arm 35a of latch 35 from wall 22b. The preloaded film cassette 42 is then dropped into cassette chamber 42a in the position illustrated in FIG. 1, with projecting film tongue 44 arrayed between guides 40a and 40b at upper and lower ends of curved screen 40. This tongue of film is a lead section and is guided by the operator over the paper guides 40a and 40b to the point where its lead edge is just entering into passageway 70a (FIG. 2). When this point has been reached, one full frame length of film paper 44 is disposed between guides 40a and 40b as illustrated generally in FIG. 1. The camera back 22 is now replaced onto the camera by snapping arm 35a of latch 35 onto upwardly projecting wall 22b, the camera again assuming the position illustrated in FIG. 1.

With the camera back latched onto the camera as described above, it becomes necessary to advance the first length of waste leader paper out of the camera to prepare the camera for the first exposure. Thus, as illustrated in FIG. 1, the section of film 44 between guides 40a and 40b has already been exposed and must therefore be removed before the camera is actually operational. As has already been noted, this advancement is achieved by means of film advance mechanism 24. In practice the operator pulls on advance knob 24a' and attached collar 24a and thereby withdraws internal shaft 24h from its freely journaled position within casing 34e (FIGS. 5 and 11). From the withdrawn position, the operator commences the clockwise rotation of mechanism 24, reaching the position illustrated in FIG. 11 after 90° of rotation. The operator may then be permitted to release the mechanism 24 which will not not resume its retracted position because of the disengagement of tab 34c' and slot 24c. The withdrawal of shaft 24 has been against the pressure of spring 24i which, following such withdrawal, is in compression between hub fixture 24g and fixed stop 24j.

The operator is instructed to continue the clockwise rotation of advance mechanism 24—this rotation can continue by simple turning of knob 24a' without any substantial force being exerted by the operator because of the disengagement of tab 34c' and slot 24c. Following a full circle of rotation (270° more than the position shown in FIG. 11), slot 24c is again aligned opposite tab 34c' and the urging of spring 24i against stop 24j causes mechanism 24 to be pulled into place with peripheral section 24b seated within circular shoulder 34c as illustrated in FIG. 5. This completes the film advance sequence and the engagement of tab 34c' and slot 24c precludes further advancement—the operator is also instructed that such rotation (i.e., one complete turn) is the desired advance distance.

Although a segment of unexposed film is now in the exposure location to the rear of exposure screen 40, the advanced section of waste leader film now seated within development tank 66 should first be severed and withdrawn. Thus, during the film advance sequence described immediately above, severing mechanism 64 was in its fully withdrawn position, i.e., a position with blade-retaining member 64f at the uppermost extent of its channel 64f' illustrated in FIG. 6. This arrangement permitted the passage through opening 70 of the waste leader film into development tank 66 which was attached to camera body 34 as illustrated in FIG. 1. Accordingly, at this time, the camera and film are in an orientation essentially intermediate that illustrated in FIGS. 1 and 2, with a fresh segment of film between guides 40a and 40b to the rear of exposure screen 40, and the advance segment of waste leader film within attached development tank 66. waste leader film segment from the film roll 44. This is achieved by inserting handle 64a which telescopes over the camera body projection 34g (FIG. 6). Handle 64a is affixed to internal shaft 64b which has near its left end upstanding pin 64d adapted to ride within slant guide slot 64e. Upon insertion of handle 64a, the inward travel of shaft 64b (and thus pin 64d) within inverted U-shaped channel 64c forces blade retaining member 64f towards the rear of the camera, i.e., downward in FIG. 6, to the position fragmentarily illustrated in dot-dash lines in FIG. 6. In the course of this travel, film 44 (not shown in FIG. 6) is severed by blade 64g; the blade then assumes the position illustrated in dot-dash lines beneath back bracket 36a in FIG. 6. In such a position, opening 70 is blocked by blade 64g and blade-retaining element 64f, with the positions of these elements corresponding substantially to the view thereof illustrated in FIG. 2. Blade mechanism 64 then remains in its inserted position, with light being prevented from entering into the camera body, until subsequent to the reattachment of the development tank 66 to be described below.

In order to remove the waste leader segment of film which has been deposited in the developing tank 66 and is now severed from the continuous roll 44, the developing tank 66 is removed from the camera as shown in FIG. 2. Thus, hanging clamp 66c is swung partially upward in a counterclockwise direction after disengagement from the recess in bracket 66b. When the clamp is free of the tank, the tank can be swung away from the camera. At such time, gate 72 immediately swings upward under the influence of leaf spring 72a, thus driving pins 74 upward and closing off passageway 70b by means of closure member 72b. (This is the same sequence of the steps which would occur when an actually exposed segment of film 44a is deposited in the tank 66 as well.) The waste lead paper 44a includes a relatively small portion which extends beyond the top of tank 66 as illustrated in FIG. 2. The operator is instructed to grasp this upper edge and simultaneously to depress one of the pins 74, thus driving gate 72 downward and freeing the film segment 44a. This film segment is then withdrawn and discarded.

At this time, assuming a fresh camera with no developer in the tank 66, the tank can now be filled. In the alternative, during the course of camera operation, this is the appropriate time for replenishing developing liquid 68. To do this, plug 66a is removed from its seat 66a' in tank 66 and additional developer is poured into the plug aperture. During this filling step, it is desirable for gate 72 to be depressed by pressure applied to pins 74 so that any air trapped in the chamber will be expelled during the filling. When the developing liquid has reached the upper level of seat 66a', plug 66a is returned to its enclosing position, pins 74 are released and the tank is prepared to be reattached to the camera. Such reattachment is achieved by elevating tank 66 from the position illustrated in FIG. 2 to that illustrated in FIG. 1 and by swinging clamp 66c down into position in the recess of bracket 66b. The position illustrated in FIG. 1, with tank 66 attached to the camera and a segment of fresh unexposed film extending from roll 44 between guides 40a and 40b is then assumed. Blade mechanism 64 is, however, still in the position illustrated in FIG. 2, with passageway 70 being blocked this position is retained until subsequent to the actual exposure, at which time blade handle 64a is withdrawn, unblocking passageway 70 and permitting the advancement of an exposed film member into developing tank 66.

THE EXPOSURE

The simplified exposure technique to be used in connection with this invention calls for the operator merely to first sight the proposed subject through viewer 26. As illustrated in FIGS. 1 and 4, light rays from the subject will appear to the operator through front aperture 28, rear aperture 30 and through bell-shaped eye guide 32. When the subject has been isolated, shutter tab 56 is depressed by the operator. The shutter thereby opens and in conventional fashion, permits the entrance of exposing light through light guide 50, lens 52, the briefly opened shutter, shutter stop 58 (see below) and internal aperture 30b into exposure chamber 34a (see FIGS. 1 and 5).

The light rays from the subject are thereby instantaneously focused through lens 52 onto film 44 through exposure screen 40. The presence of exposure screen 40 permits clarity and definition of subject to be picked up on simple emulsified film member 44, e.g., of the direct positive paper type, as described in part in copending application Ser. No. 701,918, filed Jan. 31, 1968. At the same time, a sufficient quantity of the ambient light which enters into exposure chamber 34a passes through one of the Roman numeral cutouts 46b on the periphery of indexing mechanism 46. As illustrated in FIG. 12, the exposing light representatively designated 46g exposes a section of the film border 44d corresponding to the indexing outline, thereby marking the film at 44c with the appropriate sequential number which is visible upon development.

Without departing from the simplified structure of the present invention, a certain amount of exposure flexibility can nevertheless be built in. For example, shutter stop tab 58, best illustrated in FIG. 1, can be elevated to a first upper position during which time shutter aperture 38b is unobstructed. This position will be recommended to the operator when it is anticipated that there is not sufficient available light in the exposure environment to permit the subject to be properly photographed. For example, the upper position of tab 58 will be recommended if a first picture develops too darkly or if pictures are being taken in generally overcast, cloudy or otherwise dark environments. On the other hand, when the photographing environment is bright, e.g., on sunny days, the shutter stop will be lowered to the position at which stop aperture 58a is arrayed across the exposure path through shutter aperture 58b. This will serve to limit the amount of light entering into exposure chamber 34a, with this orientation generally being illustrated in FIG. 5.

In addition to the variable shutter stop tab 58, the camera of this invention is also adapted to be used with a simplified auxiliary illuminating apparatus such as flash structure 60. This structure includes a main shaft seated on a base 60a attached to the camera and having internal wiring 60b passing up the shaft to the flash receptacle 62. When an exposure is effected by the depressing of lever 56, link 54a (FIG. 5) in shutter chamber 54 causes the lateral advancement of link 54b to which link 54a is pinned. The contacting of fixed terminal 54c by link 54b completes a flash circuit as illustrated schematically in FIG. 7. The circuit is completed to the generally shown flash structure 60, which may, for example, be loaded with suitable flash cubes in flash receptacle 62 as described in copending application Ser. No. 764,349, now U.S. Pat. No. 3,523,270, filed Oct. 1, 1968.

Sighting the subject and making the exposure in a flash situation are essentially the same as those described above in a nonflash situation—normally, in order to permit the entry of as much ambient and flash light as possible during a flash exposure, it is desirable for shutter stop 58 to be in the elevated position shown in FIG. 1, thus leaving shutter aperture 38b unobstructed.

DEVELOPMENT

Following the taking of an exposure, very similar steps to those described above with respect to advancing and removing the waste film leader are followed. Initially, severing and light trap mechanism 64 is placed in its fully withdrawn position, thus clearing film passageway 70. The film is advanced into developing tank 66 by the unlocking of advance mechanism 24 and its 360° clockwise rotation as described above. Following such rotation, blade mechanism 64 is activated and placed in its fully inserted position, thereby severing film 44. Tank 66 may then be removed from the camera as previously described, with light trap and blade mechanism 64 remaining in the fully inserted position to act as a light trap. Auxiliary timing means (not shown) can then be initiated to define the approximate limits of a developing cycle, during which time an exposed film segment 44a in developing tank 66 is being acted upon by developer 68 therein.

During the developing cycle, it may prove desirable to agitate developing tank 66 gently to permit full developing action or exposure segment 44a by the developer 68—in view of the detached condition of developing tank 66, such agitation is simplified and causes no separate agitation of the camera itself. When the auxiliary timing apparatus indicates that the end of developing cycle has arrived, the agitation is terminated and one of pins 74 is depressed, thereby giving the operator access to the protruding edge of the exposed film member 44a (as shown in the lower portion of FIG. 2). The exposed and developed picture is then removed from tank 66 and can illustratively be washed in simple water solution to achieve the necessary fixing of the developer. Rinsing is hen continued and a completed picture can be obtained simply by trimming off the irregular edge illustrated in FIG. 14 (which edge can also be retained if desired for record-keeping purposes).

It is to be understood that the above-described arrangements are illustrative of the application of the principles of the invention. Numerous other arrangements may be devised by those skilled in the art without departing from the spirit and scope of the invention.

I claim:

1. A toy camera for generating photographs of subjects comprising a camera body having an exposure chamber including a forward light entrance; light control means for directing the passage of light from said subjects into said exposure chamber and for controlling the duration of said light passage, said light control means including a front light receiving member, a lens mounted to focus said light passed through said light receiving member from said subjects towards said exposure location, a shutter chamber having a shutter mechanism communicating with said forward light entrance of said exposure chamber, and an auxiliary shutter stop having at least one aperture and adapted to be moved between a first position wherein said aperture is intermediate said shutter mechanism and said forward light entrance and a second position wherein said forward light entrance is unobstructed; film retaining means including a cassette mounted in said camera body for feeding a preloaded film member to an exposure location; exposure means in said exposure chamber for receiving and passing therethrough said light, said exposure means including a halftone screen forming one wall of said exposure chamber, guiding means for directing said film member from said cassette in substantial proximity to said screen and a forward light entrance in said exposure chamber for passing said light from said subjects through said screen to said film member at said exposure location in response to the selective activation of said light control means; film advance means cooperating with said film member for transporting a lead section of said film member from said exposure location to a developing location external of said camera body, said film advance means including a control shaft, a first pair of drive rollers mounted for rotation with said shaft, a second pair of driven rollers opposite respective ones of said first pair and adapted to bear against said film member disposed between said first and second pairs of rollers, and locking means for permitting selective advancement of said film member in response to predetermined rotational travel of said control shaft; severing means for separating said lead section from said film member and for precluding the passage of ambient light into said camera body; and developing tank means releasably secured to said camera body at said developing location for receiving therein said lead section.

2. A toy camera as defined in claim 1 wherein said film advance means further includes rotational control means comprising a housing surrounding at least a portion of said control shaft and adapted to rotate with said shaft, a limiting spring helically wound around said housing with one end fixed to said camera body and a free end to permit rotation of said housing in the rotational direction from said free end to said fixed end and to restrict said rotation in the rotational direction from said fixed end to said free end.

3. A toy camera as defined in claim 1 wherein said locking means includes a shaft mount formed in a wall of said camera body and having an internal circumferential shoulder, a tab projecting from said shoulder, a collar attached to said shaft projecting through said mount having a peripheral slot formed in said collar and adapted to selectively engage said tab to maintain said film advance means in a first locked position and to be disengaged from said tab to establish a second film advance position.

4. A toy camera as defined in claim 3 wherein said film advance means further includes lateral control means comprising a stop fixedly mounted on said shaft between said drive rollers, a hub surrounding said shaft and coupled to one of said drive rollers, a locking control spring mounted between said stop and said hub adapted to be in a normal mode when said film advance means is in said locked position and in a compressed mode when said shaft is withdrawn through said shaft mount to establish said film advance position.

5. A toy camera for generating photographs of subjects comprising a camera body having an exposure chamber; light control means for directing the passage of light from said subjects into said exposure chamber and for controlling the duration of said light passage; exposure means at an exposure location in said exposure chamber for receiving and passing therethrough said light; film retaining means for feeding a preloaded film member to said exposure location; film advance means cooperating with said film member for transporting a lead section of said film member from said exposure location to a developing location external of said camera body; severing means for separating said lead section from said film member and for precluding the passage of ambient light into said camera body, said severing means including a first guide channel, a main shaft riding in said first guide channel, a pin projecting from said main shaft, a second guide channel substantially orthogonal to said first guide channel, a cutting member having a slotted portion for receiving said pin and a blade portion retained by and moving with said slotted portion, an extension projecting from said camera body enclosing said shaft and a handle attached to said main shaft mounted for inward movement over said extension to transfer said cutting member along said second guide channel whereby said blade portion severs said lead section from said film member; and developing tank means releasably secured to said camera body at said developing location for receiving therein said lead section.

6. A toy camera as defined in claim 5 further including a passageway in said camera body communicating between said exposure and developing locations, and wherein said slotted portion defines an internal cam slot oblique to the direction of movement of said main shaft, said cutting member traveling between a first position with said pin at one end of said cam slot wherein said passageway is unobstructed and a second position with said pin at the opposite end of said cam slot wherein said passageway is blocked.

7. A toy camera for generating photographs of subjects comprising a camera body having an exposure chamber; light control means for directing the passage of light from said subjects into said exposure chamber and for controlling the duration of said light passage; exposure means at an exposure location in said exposure chamber for receiving and passing therethrough said light; film retaining means for feeding a preloaded film member to said exposure location; film advance means cooperating with said film member for transporting a lead section of said film member from said exposure location to a developing location external of said camera body, said film advance means including a control shaft, at least one drive roller mounted for rotation with said shaft, and at least one driven roller opposite said drive roller and adapted to bear against said film member disposed between said drive and driven rollers, said at least one driven roller including an inner rim, a plurality of cutouts from said inner rim representative of identifying indicia to be applied to each of said photographs, said film advance means further including rotational control means for advancing said driven roller to sequentially align each of said cutouts adjacent successive ones of said lead sections of said film member at said exposure location; severing means for separating said lead section from said film member and for precluding the passage of ambient light into said camera body; and developing tank means releasably secured to said camera body at said developing location for receiving herein said lead section.

8. A toy camera as defined in claim 7 wherein said exposure chamber includes a forward light entrance, and including a shutter adapted to admit light from said subjects to said exposure chamber through said forward light entrance, said lead section of said film member including an image portion and a border portion and said light control means including a lens for directing said light towards said exposure location on said image portion of said lead section to generate said subject and on said border of said lead section to generate said indicia having the outline of said aligned one of said cutouts.

9. A toy camera as defined in claim 8 wherein said cutouts are formed in the outline shape of sequential Roman numerals.

10. A toy camera for generating photographs of subjects comprising a camera body having an exposure chamber; light control means for directing the passage of light from said subjects into said exposure chamber and for controlling the duration of said light passage; exposure means at an exposure location in said exposure chamber for receiving and passing therethrough said light; film retaining means for feeding a prelight into said camera body; and developing tank means releasably secured to said camera body at said developing location for receiving therein said lead section, said developing tank means including a chamber for containing developing liquid, an entrance passageway communicating with a portion of said exposure location when said tank is secured to said camera body, a pivoted gate movable between a first position blocking said passageway when said tank is detached from said camera body and a second position unblocking said passageway when said tank is secured to said camera body, and internal guide walls within said liquid chamber for accepting therebetween said lead section of said film member from said exposure location through said entrance passageway.

11. A toy camera as defined in claim 10 wherein said tank further includes a spring adapted to urge said gate into said first position, at least one pin having a base in contact with said gate and a tip adapted to depress said gate into said second position against the urging of said spring when said tank is secured to said camera body, said gate also including a closure member for blocking said passageway when said gate assumes said first position.

12. A toy camera as defined in claim 11 including a clamp depending from said camera body and a notched bracket beneath said tank for receiving said clamp therein to secure said tank to said camera body.

13. A toy camera for generating photographs of subjects comprising a camera body having an exposure chamber including a forward light entrance; light control means for directing the passage of light from said subjects into said exposure chamber and for controlling the duration of said light passage, said light control means including a front light receiving member, a lens mounted to focus said light passed through said light receiving member from said subjects toward said exposure location, a shutter chamber having a shutter mechanism communicating with said forward light entrance of said exposure chamber and an auxiliary shutter stop having at least one aperture and adapted to be moved between a first position wherein said aperture is intermediate said shutter mechanism and said forward light entrance and a second position wherein said forward light entrance is unobstructed; exposure means at an exposure location in said exposure chamber for receiving and passing therethrough said light; film retaining means for feeding a preloaded film member to said exposure location; film advance means cooperating with said film member for transporting a lead section of said film member from said exposure location to a developing location external of said camera body; severing means for separating said lead section from said film member and for precluding the passage of ambient light into said camera body; developing tank means releasably secured to said camera body at said developing location for receiving therein said lead section; auxiliary illuminating apparatus having an illuminating element, a voltage source, first conducting means connecting said illuminating element and at least one terminal of said voltage source and a second conducting means in said camera body adapted to complete a circuit between said illuminating element and said voltage source in response to the activation of said shutter mechanism; said shutter mechanism including an external exposure control tab, a first link operatively connected to said tab and a second link coupled for movement with said first link to complete said circuit to energize said illuminating element.